(12) United States Patent
Hofmann et al.

(10) Patent No.: US 10,301,861 B2
(45) Date of Patent: May 28, 2019

(54) ACTUATION SYSTEM AND OVEN COMPRISING SAID ACTUATION SYSTEM

(71) Applicant: Electrolux Appliances Aktiebolag, Stockholm (SE)

(72) Inventors: Arnd Hofmann, Rothenburg ob der Tauber (DE); Fabienne Reinhard-Herrscher, Rothenburg ob der Tauber (DE)

(73) Assignee: Electrolux Appliances Aktibolag, Stockholm (SE)

( * ) Notice: Subject to any disclaimer, the term of this patent is extended or adjusted under 35 U.S.C. 154(b) by 398 days.

(21) Appl. No.: 14/915,420

(22) PCT Filed: Jul. 30, 2014

(86) PCT No.: PCT/EP2014/066326
§ 371 (c)(1),
(2) Date: Feb. 29, 2016

(87) PCT Pub. No.: WO2015/062757
PCT Pub. Date: May 7, 2015

(65) Prior Publication Data
US 2016/0208539 A1    Jul. 21, 2016

(30) Foreign Application Priority Data

Oct. 31, 2013 (EP) ..................... 13191079

(51) Int. Cl.
*E05F 15/60* (2015.01)
*F03G 7/06* (2006.01)
(Continued)

(52) U.S. Cl.
CPC .............. *E05F 15/60* (2015.01); *E05D 11/00* (2013.01); *F03G 7/065* (2013.01); *F24C 15/028* (2013.01);
(Continued)

(58) Field of Classification Search
CPC ........................ E05Y 2201/43; E05Y 2800/67
(Continued)

(56) References Cited

U.S. PATENT DOCUMENTS 4,842,136 A * 6/1989 Nakazato .................. G03F 1/66
16/48.5
4,984,953 A * 1/1991 Nakazato ............ G03F 7/70741
220/260

(Continued)

FOREIGN PATENT DOCUMENTS

| DE | 19817399 A1 | 11/1998 | |
|----|----|----|----|
| EP | 2461065 A1 * | 6/2012 | ............. F16F 1/021 |
| JP | 08210241 A * | 8/1996 | |

OTHER PUBLICATIONS

EP 2461065 A1—English machine translation.*
(Continued)

*Primary Examiner* — Jorge A Pereiro
(74) *Attorney, Agent, or Firm* — Pearne & Gordon LLP

(57) ABSTRACT

An actuation system for automatic actuation of at least one element covering an opening of a household appliance. The actuation system includes at least one actuation element constituted by at least one shape memory alloy element. The actuation system is adapted to actuate the element when applying heat to the actuation element.

19 Claims, 4 Drawing Sheets

(51) Int. Cl.
*E05D 11/00* (2006.01)
*F24C 15/02* (2006.01)
(52) U.S. Cl.
CPC ....... *E05Y 2201/43* (2013.01); *E05Y 2800/67* (2013.01); *E05Y 2900/308* (2013.01); *F24C 15/023* (2013.01)
(58) Field of Classification Search
USPC .............................................. 49/1–8, 25, 31
See application file for complete search history.

(56) References Cited

U.S. PATENT DOCUMENTS

| | | | | |
|---|---|---|---|---|
| 5,272,888 A * | 12/1993 | Fisher | ................ | F25C 5/22 62/344 |
| 5,796,152 A * | 8/1998 | Carr | ................ | H01H 1/0036 257/415 |
| 6,175,989 B1 * | 1/2001 | Carpenter | ................ | B64G 1/222 136/245 |
| 7,354,033 B1 * | 4/2008 | Murphey | ................ | B64G 1/222 267/151 |
| 8,567,885 B2 | 10/2013 | Lee | ................ | E05D 7/0027 312/405 |
| 9,638,176 B2 * | 5/2017 | Shivashankara | .......... | B64C 9/32 |
| 2002/0194702 A1 * | 12/2002 | Hinkley | ................ | E05D 1/02 16/260 |
| 2002/0195177 A1 * | 12/2002 | Hinkley | ................ | C22F 1/006 148/559 |
| 2005/0198777 A1 * | 9/2005 | Mabe | ................ | E05D 5/10 16/308 |
| 2005/0247411 A1 * | 11/2005 | Shim | ................ | B60J 5/0494 160/84.07 |
| 2006/0186700 A1 * | 8/2006 | Browne | ................ | B60J 7/04 296/187.01 |
| 2007/0072541 A1 * | 3/2007 | Daniels, II | ................ | F24F 7/02 454/365 |
| 2007/0137740 A1 * | 6/2007 | Johnson | ................ | A61L 31/022 148/562 |
| 2008/0120911 A1 * | 5/2008 | Browne | ................ | E05B 47/0009 49/352 |
| 2008/0125195 A1 * | 5/2008 | Maenpaa | ................ | H04M 1/0216 455/575.3 |
| 2008/0148960 A1 * | 6/2008 | Berger | ................ | F24C 15/022 99/327 |
| 2009/0061188 A1 * | 3/2009 | Browne | ................ | B32B 7/045 428/217 |
| 2010/0212312 A1 * | 8/2010 | Rudduck | ................ | F03G 7/065 60/527 |
| 2011/0173970 A1 * | 7/2011 | Torres-Jara | ................ | F03G 7/06 60/528 |
| 2013/0000206 A1 * | 1/2013 | O'Kane | ................ | G12B 1/02 49/472 |
| 2013/0091772 A1 * | 4/2013 | Berger | ................ | F25C 5/22 49/324 |
| 2013/0240320 A1 * | 9/2013 | Browne | ................ | F03G 7/065 192/84.9 |
| 2014/0102090 A1 * | 4/2014 | Koehler | ................ | F03G 7/065 60/527 |
| 2015/0015001 A1 * | 1/2015 | Fabbro | ................ | D06F 39/14 292/198 |
| 2015/0084353 A1 * | 3/2015 | Koehler | ................ | E05B 47/0009 292/336.3 |

OTHER PUBLICATIONS

JP 08210241 A—English machine translation.*
International Search Report for PCT/EP2014/066326, dated Oct. 14, 2014, 2 pages.

* cited by examiner

ACTUATION SYSTEM AND OVEN COMPRISING SAID ACTUATION SYSTEM

The present invention relates generally to the field of actuation systems. More specifically, the present invention is related to an activation system for household appliances based on shape memory alloys.

BACKGROUND OF THE INVENTION

Ovens for food preparation are well-known in prior art. Said ovens comprise a base body forming an oven cavity with a cavity opening for receiving the food to be prepared. In addition, the oven comprises a door for closing the cavity opening. The oven door acts as a thermal barrier to keep the heat energy in the cavity during operation of the oven. Typically, oven doors are at least partially transparent in order to enable the user to control the process of food preparation within the closed cavity.

The oven door may be pivotally mounted to the oven cavity by means of hinges which allow a movement of the oven door relative to the oven cavity. There are several types of door arrangements, which are particularly suited for actuation by actuation systems, namely a so-called drop-down door which is pivotally mounted at a horizontal rotation axis, a so-called side-opening door pivotally mounted at a vertical rotation axis or a so-called "French door" consisting of two doors being pivotally mounted at opposite sides of the oven cavity to be opened by rotating or swinging in different directions around vertical rotation axes.

Typical oven doors are manually operated. They comprise a handle for applying manual force to the door to be opened. Furthermore, another type of oven comprises an automatically actuated door wherein the activation is done by an electric motor.

A drawback of known ovens comprising an automatically actuated door is that the electric motor requires a lot of space which has negative impact on the volume of the oven cavity. Furthermore, electric motors are expensive and mechanical coupling of the motor to the door to be opened is quite complex. Accordingly, there is a need for improvements of existing household appliances comprising an automatically actuated door in order to save installation space within the household appliance and to save costs and constructional expenses.

SUMMARY OF THE INVENTION

It is an objective of embodiments of the invention to provide for an improved activation system for a household appliance and a household appliance with an improved door activation system. The objective is solved by the features of the independent claims. Preferred embodiments are given in the dependent claims. If not explicitly indicated otherwise, embodiments of the invention can be freely combined with each other.

According to a first aspect of the invention, the invention relates to an actuation system for automatic actuation of at least one element covering an opening of a household appliance. The opening may be a cavity opening or an opening providing access to interior parts of the household appliance. Said element may be a door covering a cavity of the household appliance or a covering element adapted to cover an opening of the household appliance. The household appliance may be an oven, a heatable drawer, a refrigerator, a freezer etc. The actuation system comprises at least one actuation element constituted by at least one shape memory alloy element and the actuation system is adapted to actuate the element when applying heat to the actuation element.

When activating the actuation system, the element may get opened or closed. Advantageously, the inventive actuation system is significantly smaller than actuation systems comprising an electrical motor with comparable actuating performance. Additionally, actuation systems based on shape memory alloys are less expensive because said actuators do not need rare-earth magnets like compact electrical motors of comparable performance. Finally, in contrast to conventional electrical motors, actuation systems based on shape memory alloys operate silently, so there is no noise generated while opening the element.

According to preferred embodiments, the actuation element comprises a plurality of shape memory alloy wires and/or the actuation element comprises a stack of at least two laminar shape memory alloy elements. Thereby, the force generated by the actuation system can be significantly increased.

According to preferred embodiments, the actuation element comprises a planar shape and is adapted to contract to a memorized shape when heated. Thereby, the actuation of the element may be achieved by a tensile force applied to the element and/or the body of the household appliance, respectively, to the arms of a hinge pivotally mounting the element to the household appliance.

According to preferred embodiments, the actuation element comprises a curved shape and is adapted to reduce the curvature when heated. Thereby, the actuation of the element may be achieved by a pressure applied to the element and/or the body of the household appliance, respectively, to the arms of a hinge pivotally mounting the element to the body of the household appliance.

According to preferred embodiments, the actuation system is an integral part of a hinge for pivotally mounting the element to the body of the household appliance. Said hinge may be specifically adapted to the active principle of the actuation element thereby raising the performance of the actuation system.

According to preferred embodiments, the actuation system forms an extension module to be integrated in or connected to an existing hinge. So, the extension module may be adapted to be arranged at standard hinges, especially standard household appliance hinges and a plurality of passive hinges can be retrofitted with the actuation system according to the invention.

According to preferred embodiments, the actuation element is electrically heated. Said heating may be achieved by an electrical heating element which is thermally coupled with the SMA actuation element or said SMA actuation element heating itself by Joule heating, i.e. resistance heating.

According to a second aspect, the invention refers to a household appliance comprising at least one element covering an opening of the household appliance. The household appliance comprises at least one actuation system described above for automatic actuating the at least one element. The household appliance may be an oven, a heatable drawer, a refrigerator, a freezer etc. The opening may be a cavity opening or an opening providing access to interior parts of the household appliance, for example to a frequently operated object, e.g. a water tank. Said element may be a door covering a cavity of the household appliance or a covering element adapted to cover an opening of the household appliance.

According to preferred embodiments, the element is designed to be opened from a closed position to a maximum opening angle and the actuation system is adapted to actuate the element through a portion of the maximum opening angle. Thereby, the opening of the element may be realized with lower technical effort.

According to preferred embodiments, a handle of the element is located such that it only gets accessible to the user after the element has at least partially been opened by the actuation system. Thereby, in the closed state the handle is invisible and does not stick out laterally at the outer face of the household appliance.

According to preferred embodiments, the element is pivotally mounted to the body of the household appliance by at least two hinges, wherein one of said hinges is actuated by the actuation system. Thereby the actuation may be realized with reduced technical effort.

According to preferred embodiments, the element is pivotally mounted to the body of the household appliance by at least two hinges, wherein two or more of said hinges are actuated by the actuation system. Thereby the actuation force may be additionally raised.

According to preferred embodiments, two elements are pivotally mounted at opposite sides of the body of the household appliance to be opened by rotating or swinging in different directions, wherein each element is autonomously moved by a separate actuation system. The activation and control of the elements may be synchronized in order to achieve desired opening characteristics.

According to other preferred embodiments, two elements are pivotally mounted at opposite sides of the body of the household appliance to be opened by swiveling in different directions, wherein the two elements are connected by a mechanic coupling mechanism and mechanically powered by only one actuation system. Thereby the actuation may be realized with reduced technical effort.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
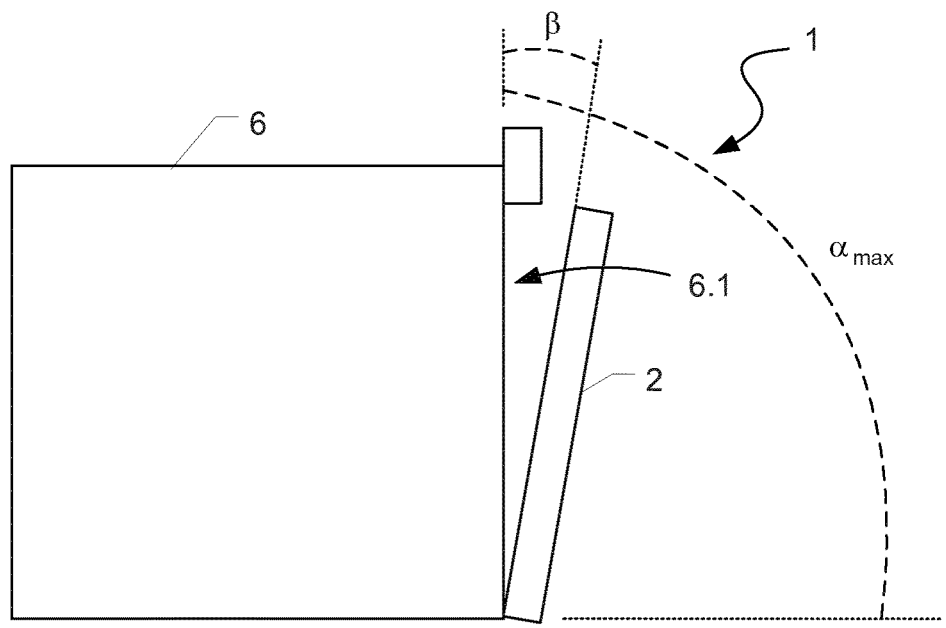
FIG. 1 shows a schematic side view of an oven with a partially opened door.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

Figure 2:
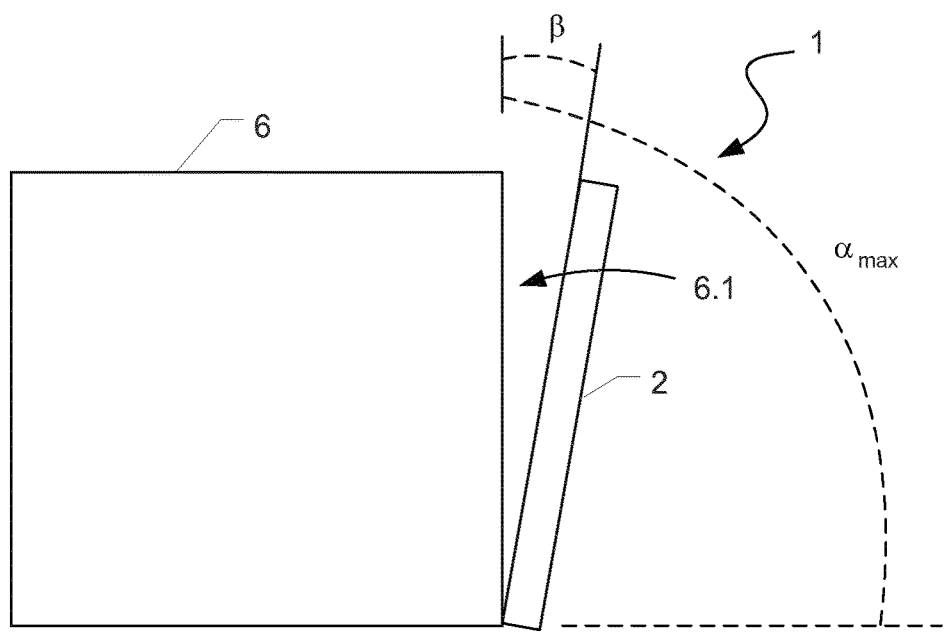
FIG. 2 shows a schematic top view of an oven with a partially opened door.
Figure 3:
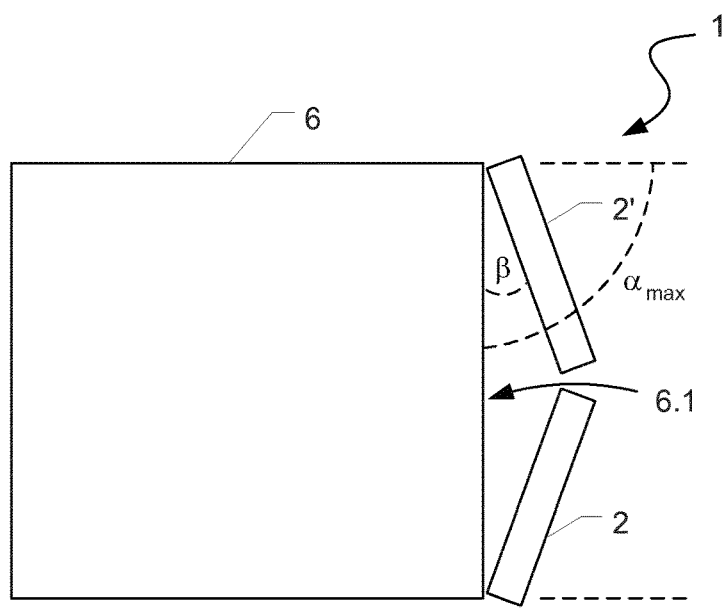
FIG. 3 shows a schematic top view of an oven with partially opened "French-type" doors.

In the following, the embodiments of the invention are described using an oven as an example of a household appliance. FIG. 1 to FIG. 3 show different types of ovens 1. All ovens 1 comprise an oven cavity 6 with a cavity opening 6.1 and at least one oven door 2 which is adapted to cover the cavity opening 6.1. FIG. 1 shows a schematic side view of an oven 1 with a so-called drop-down door, i.e. the door is pivotally mounted at a lower border of the cavity opening 6.1 in order to enable the door to pivot around a lower horizontal pivot axis. The door is adapted to be opened from a closed position in which the cavity opening is sealed to a maximum opening angle $\alpha_{max}$. The maximum opening angle $\alpha_{max}$ may be 90° or essentially 90°.

FIG. 2 shows a schematic top view of an oven 1 with a side-opening door, i.e. the door is pivotally mounted at the left or right border of the oven cavity 6.1 in order to enable the door to pivot around a vertical pivot axis. The door is adapted to be opened from a closed position in which the cavity opening is sealed to a maximum opening angle $\alpha_{max}$. The maximum opening angle $\alpha_{max}$ may be 90° or essentially 90°.

FIG. 3 shows a schematic top view of an oven 1 with so-called "French-door" concept. The oven 1 comprises a pair of oven doors 2, 2' wherein a first door 2 is pivotally mounted at the left border of the cavity opening 6.1 by a first vertical pivot axis and a second door 2' is pivotally mounted at the right border of the cavity opening 6.1 by a second vertical pivot axis parallel to the first pivot axis. In other words, the doors 2, 2' are mounted at opposite sides of the cavity opening 6.1, wherein the first door 2 opens to the left side and the second door 2' opens to the right side. If both doors 2, 2' are closed, the cavity opening 6.1 is covered by both doors 2, 2'. Both doors are adapted to be opened from a closed position in which the cavity opening 6.1 is sealed to a maximum opening angle $\alpha_{max}$. The maximum opening angle $\alpha_{max}$ may be 90° or essentially 90°.

Figure 4:
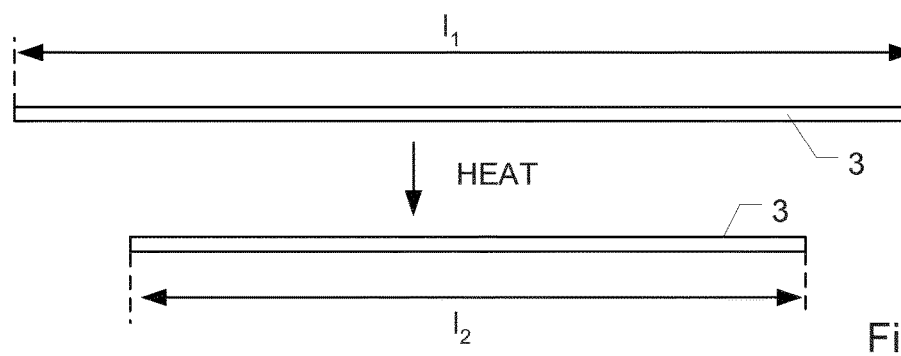
FIG. 4 shows a first type of shape memory alloy with a essentially planar structure.
Figure 5:
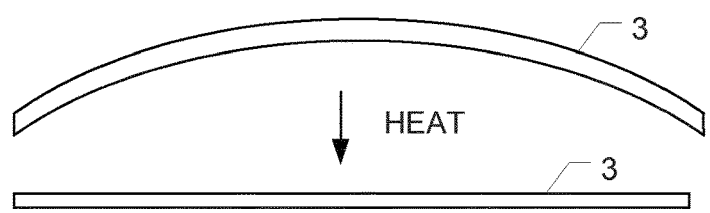
FIG. 5 shows a second type of shape memory alloy with a curved structure.

FIGS. 4 and 5 show actuation elements 3 for actuating an oven door 2. The actuation element 3 is formed by a shape memory alloy element consisting of a shape memory alloy (SMA). Shape memory alloy is characterized by a cold state, i.e. when the temperature of the alloy is below its martensite finish temperature. A shape memory alloy is also characterized by a hot state, i.e., in the temperature of the alloy is above its austenite finish temperature. An object formed of the alloy may be characterized by a predetermined shape. When the object is deformed in the cold state, the strain may be reversed by heating the object above its austenite finish temperature, i.e. heating the object above its austenite finish temperature will cause the object to return to its predetermined shape.

A first type of actuation element 3 shown in FIG. 4 may comprise a planar or essentially planar shape in the released, cold state. When heat is applied to the actuation element 3 (as indicated by the arrow), the geometric dimensions of the actuation element 3 are reduced, e.g. the length is reduced from a first length $l_1$ (cold length) to a second length $l_2$ (hot length), wherein $l_2 < l_1$. In other words, the actuation element 3 is contracting to a memorized length by applying heat. Thereby, tensile force can be applied to the oven door 2, respectively, the oven cavity 6 in order to actuate the oven door 2, i.e. the tensile force leads to an opening and/or closing of the oven door 2.

FIG. 5 shows a second type of actuation element 3. The actuation element 3 comprises a curved shape. In the current embodiment, the actuation element 3 shows a convex shape in the released, cold state. By heating the actuation element 3 (as indicated by the arrow), said actuation element 3 is activated and the curvature is minimized or the actuation element 3 reforms to a straight, planar shape. Due to the deforming, pressure can be applied to the oven door 2, respectively, the oven cavity 6 in order to actuated the oven door 2, i.e. the pressure leads to an opening and/or closing of the oven door 2.

Typically, actuation systems based on single shape memory alloy wires are restricted to applications where only low to medium forces occur. In order to increase the force of the actuation system, a plurality of shape memory alloy elements may be combined within the actuation system.

Figure 6:
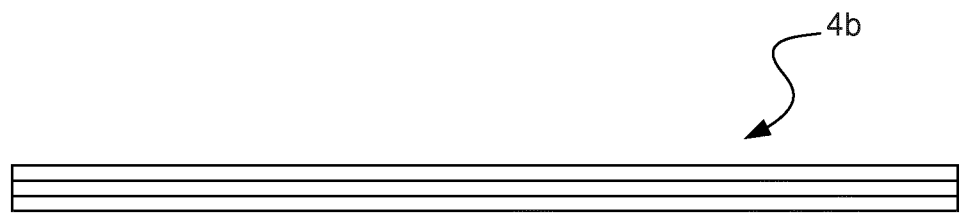
FIG. 6 shows an actuation element comprising a stack of planar shape memory alloys.

FIG. 6 shows a stacked arrangement of laminar shape memory alloy elements 4b. The shape memory alloy elements 4b may be adapted to apply tensile force (as described before in connection with FIG. 4) or may be adapted to apply pressure (as described before in connection with FIG. 5). When heat is applied to the stack of shape memory alloy elements 4b, all elements are deformed leading to an increased tensile force or pressure.

Figure 7:
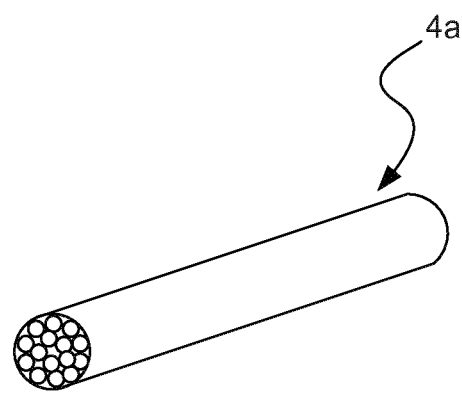
FIG. 7 shows an actuation element comprising a plurality of shape memory alloy wires.

FIG. 7 shows another possibility of increasing the actuation force of the actuation system. The shape memory alloy element 4a shows a steel-rope-like structure with a round cross-section. The shape memory alloy element 4a comprises a plurality of wires consisting of shape memory alloy. When heat is applied to the plurality of wires, all wires are deformed leading to an increased tensile force.

Figure 8:
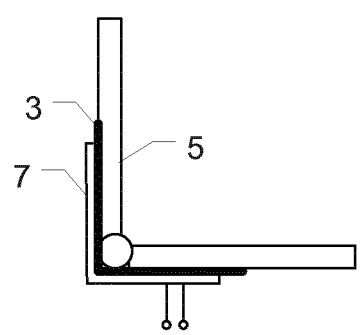
FIG. 8 shows a hinge with an actuation element in a schematic side view.

FIG. 8 shows a schematic integration of the actuation system comprising at least one actuation element 3 made of shape memory alloy in a hinge 5 adapted for pivotally mounting an oven door 2 to the oven cavity 6. The actuation element 3 may be an integral part of the hinge 5, i.e. the hinge 5 replaces a conventional hinge of the oven.

In another embodiment, the actuation element 3 may be adapted as extension module which may be capable of being integrated into an existing hinge 5. Thereby, it is possible to combine the extension module with different types of conventional hinges 5.

The actuation element 3 may be thermally coupled with an electric heating element 7 for applying heat to the actuation element 3. Alternatively, the actuation element 3 may comprise a heating element embedded in the interior of the actuation element 3. The electric heating element 7 may be connected to the main supply or powered via a transformer with an appropriate voltage.

According to preferred embodiments, the actuation system may be adapted to open the oven door 2 from a closed position to a certain opening angle β wherein the opening angle β is smaller than the maximum opening angle $α_{max}$ of the oven door 2 ($β < α_{max}$). The oven may comprise a handle which is not accessible by the user in the closed position of the oven door 2. If the oven door 2 is automatically opened by the actuation system to the opening angle β, the handle may be accessible and may be manually opened by the user by means of the handle.

The oven door 2 may be mounted to the oven cavity 6 by means of at least two hinges 5, wherein only one hinge comprises an actuation system as described before. In another embodiment, at least two or all hinges 5 fixing the oven door 2 at the cavity opening 6.1 comprise said actuation system and the actuation elements 3 of the actuation systems are synchronously powered in order to cause the oven door 2 to be opened.

In "French-type" ovens comprising a pair of oven doors 2, 2' each door may comprise at least one actuation system based on a shape memory alloy actuation element 3. In other words, each door is driven by a separate actuation system. Alternatively, only one door comprises an actuation system as mentioned above and the further door is driven by a mechanically coupling between the first and second door 2, 2'. Thereby, both doors can be opened using only one actuation system.

Figure 9:
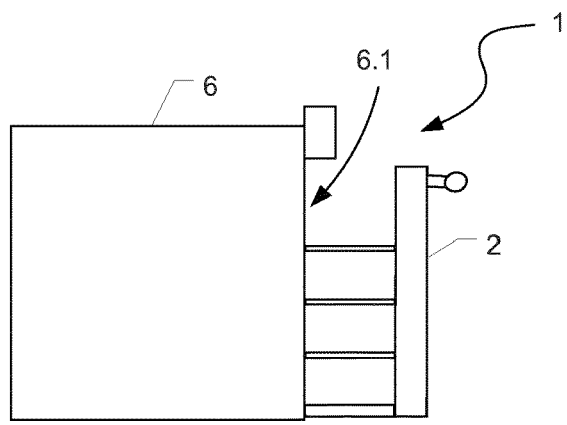
FIG. 9 shows a schematic side view of an oven with a partially opened sliding door.

FIG. 9 shows as a further embodiment an oven 1 with a sliding oven door 2. The sliding oven door is adapted to be pulled away from the oven cavity 6 for opening the cavity and to be slid in for closing the cavity. The movement of the sliding oven door may be at least partially actuated by an actuation system comprising at least one SMA element.

Figure 10:
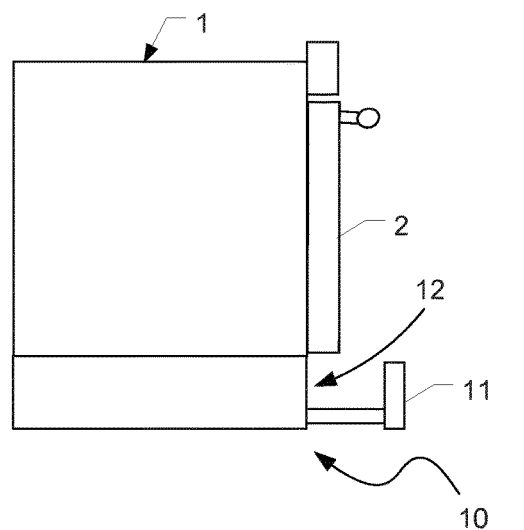
FIG. 10 shows a schematic side view of a heatable drawer with a sliding element.

FIG. 10 shows as a heatable drawer 10. The heatable drawer comprises a sliding element 11 and a heatable cavity 12. The sliding element 11 is adapted to be pulled away from the heatable cavity 12 for opening the cavity and to be slid in for closing the heatable cavity 12. The movement of the sliding element 11 may be at least partially actuated by an actuation system comprising at least one SMA element.

Figure 11:
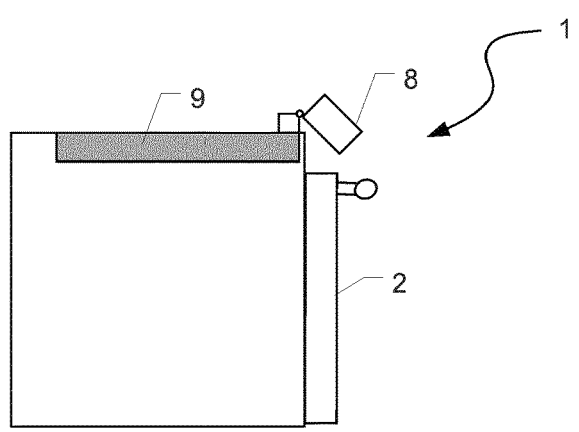
FIG. 11 shows a schematic side view of an oven with a partially opened covering element.

FIG. 11 shows as a further embodiment an oven 1 with a movable covering element 8. The covering element 8 may be constituted by the control panel or may comprise said control panel. Said control panel may comprise a user interface for operating the oven 1. The covering element 8 is rotatably mounted at the cavity by means of a hinge, wherein the rotation axis may be a vertical or a horizontal axis. The movement of the covering element 8 may be at least partially actuated by an actuation system comprising at least one SMA element. The covering element 8 may in a closed position cover an opening of the oven 1 and may provide access to said opening in an open position. Within said opening a detachable part 9 of the oven may be located, for example a water tank of a steam cooker.

Above, embodiments of the door actuation system according to the present invention as defined in the appended claims have been m described. These should be seen as merely non-limiting examples.

As understood by a skilled person, many modifications and alternative embodiments are possible within the scope of the invention.

LIST OF REFERENCE NUMERALS 1 oven
2, 2' oven door
3 actuation element
4a, 4b shape memory alloy element
5 hinge
6 oven cavity
6.1 cavity opening
7 electric heating element
8 detachable part
9 covering element
10 heatable drawer
11 sliding element
12 heatable cavity $\alpha_{max}$ maximum opening angle
$\beta$ reduced opening angle
$l_1$ first length
$l_2$ second length

The invention claimed is:

1. Household appliance comprising:
   at least one first element selectively closing an opening of the household appliance, said at least one first element comprising a handle;
   a first hinge pivotally connecting the at least one element to a body of the household appliance, the first hinge including one arm attached to the at least one first element and a second arm attached to the body of the household appliance; and
   at least one actuation system comprising:
     at least one actuation element including at least one shape memory alloy element having a first shape at a first temperature and configured to contract to a memorized shape when heated to a second temperature in order to apply a tensile force to the first and second arms of said first hinge, said at least one actuation element thereby being effective to actuate the at least one first element when heat is applied to the at least one actuation element;
   wherein the handle is located such that it only gets accessible to a user after the at least one first element has at least partially been opened by the at least one actuation system.

2. The household appliance according to claim 1, wherein the at least one first element actuated by the at least one actuation element is a door covering a cavity of the household appliance and/or a covering element to be moved relatively to the body of the household appliance.

3. The household appliance according to claim 1, wherein the at least one first element is adapted to be opened from a closed position to a maximum opening angle and the at least one actuation system is adapted to actuate the at least one first element through a portion of the maximum opening angle.

4. The household appliance according to claim 1, further comprising a second hinge for pivotally mounting the at least one first element to the body of the household appliance.

5. The household appliance according to claim 1, further comprising a second hinge for pivotally mounting the at least one first element to the body of the household appliance, wherein the first hinge and the second hinge are actuated by the at least one actuation system.

6. The household appliance according to claim 1, comprising two said first elements being pivotally mounted at opposite sides of the body of the household appliance to be opened by swinging in different directions, wherein each said first element is autonomously moved by a separate one of said actuation systems or the two said first elements are connected by a mechanic coupling mechanism and mechanically moved by only one said actuation system.

7. The household appliance according to claim 1, wherein the at least one shape memory alloy element comprises a plurality of shape memory alloy wires and/or a stack of at least two laminar shape memory alloy elements.

8. The household appliance according to claim 1, wherein the at least one actuation system is an integral part of the first hinge for pivotally mounting the at least one first element to the body of the household appliance.

9. The household appliance according to claim 1, wherein the at least one actuation system forms an extension module to be integrated in said first hinge.

10. The household appliance according to claim 1, wherein the at least one actuation element is electrically heated.

11. The household appliance according to claim 1, wherein the first shape is a planar shape.

12. Household appliance comprising:
    at least one first element selectively closing an opening of the household appliance, said at least one first element comprising a handle;
    a first hinge pivotally connecting the at least one first element to a body of the household appliance, the first hinge including one arm attached to the at least one first element and a second arm attached to the body of the household appliance; and
    at least one actuation system comprising:
      at least one actuation element including at least one shape memory alloy element having a curved shape at a first temperature and configured to reduce a curvature of the curved shape when heated to a second temperature in order to apply a tensile force to the first and second arms of said first hinge, said at least one actuation element thereby being effective to actuate the at least one first element when heat is applied to the at least one actuation element;
    wherein the handle is located such that it only gets accessible to a user after the at least one first element has at least partially been opened by the at least one actuation system.

13. The household appliance according to claim 12, wherein the at least one first element actuated by the at least one actuation element is a door covering a cavity of the household appliance and/or a covering element to be moved relatively to the body of the household appliance.

14. The household appliance according to claim 12, wherein the at least one first element is adapted to be opened from a closed position to a maximum opening angle and the at least one actuation system is adapted to actuate the at least one first element through a portion of the maximum opening angle.

15. The household appliance according to claim 12, further comprising a second hinge for pivotally mounting the at least one first element to the body of the household appliance.

16. The household appliance according to claim 12, further comprising a second hinge for pivotally mounting the at least one first element to the body of the household appliance, wherein said first hinge and said second hinge are actuated by the at least one actuation system.

17. The household appliance according to claim 12, comprising two said first elements being pivotally mounted at opposite sides of the body of the household appliance to be opened by swinging in different directions, wherein each said first element is autonomously moved by a separate actuation system or the two said first elements are connected by a mechanic coupling mechanism and mechanically moved by only one said actuation system.

18. The household appliance according to claim 12, wherein the at least one shape memory alloy element comprises a plurality of shape memory alloy wires and/or a stack of at least two laminar shape memory alloy elements.

19. The household appliance according to claim 12, wherein the at least one actuation element is electrically heated.

* * * * *